United States Patent [19]

Randall et al.

[11] 3,928,018
[45] Dec. 23, 1975

[54] N-SUBSTITUTED-P-(2-CHLOROETHYL)-PHOSPHONAMIDATES AS YIELD IMPROVERS

[75] Inventors: David I. Randall; Robert W. Wynn, both of Easton, Pa.

[73] Assignee: GAF Corporation, New York, N.Y.

[22] Filed: Feb. 11, 1974

[21] Appl. No.: 441,317

Related U.S. Application Data

[60] Continuation of Ser. No. 230,456, Feb. 29, 1972, abandoned, which is a division of Ser. No. 881,579, Dec. 2, 1969, Pat. No. 3,679,780.

[52] U.S. Cl. .................................................. 71/86
[51] Int. Cl.² ......................................... A01N 9/36
[58] Field of Search .................................... 71/86

[56] References Cited
UNITED STATES PATENTS

| | | | |
|---|---|---|---|
| 2,959,590 | 11/1960 | Moss | 71/86 |
| 3,010,986 | 11/1961 | Reetz | 260/959 |
| 3,157,685 | 11/1964 | Szabo et al. | 71/86 |
| 3,384,683 | 5/1968 | Schwarze | 71/86 |
| 3,511,632 | 5/1970 | Wollensak et al. | 71/86 |

OTHER PUBLICATIONS

Iwahori et al., "Accelerating Tomato Fruit Maturity etc.," (1969) Cal. Agr. pp. 17–18 (1969).
Grapov et al., "Org. Insectofungicides, etc.;" (1968) CA 70 No. 37882K. (1969)
Kabachnik et al., "Organophosphorus Compds. etc.;" (1946) CA 42 pp. 7241–7243 (1948).

*Primary Examiner*—Glennon H. Hollrah
*Attorney, Agent, or Firm*—Walter C. Kehm

[57] ABSTRACT

Plant growth regulating compounds are N-substituted-P-(2-chloroethyl)-phosphonamidic esters of the formula:

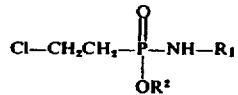

wherein $R_1$ is halophenyl and $R_2$ is alkyl or haloalkyl. They are prepared by the reaction of 2-chloroethylphosphonohalidic esters with the appropriate haloaniline.

9 Claims, No Drawings

N-SUBSTITUTED-P-(2-CHLOROETHYL)-PHOSPHONAMIDATES AS YIELD IMPROVERS

This is a continuation of application Ser. No. 230,456, filed Feb. 29, 1972, now abandoned, which application is a division of application Ser. No. 881,579 filed Dec. 2, 1969, issued as U.S. Pat. No. 3,679,780 on July 25, 1972.

BACKGROUND OF THE INVENTION

1. Field of the Invention

This invention relates to N-mono-substituted-P-(2-chloroethyl) phosphonamidate compounds useful as plant growth regulators and processes for their preparation.

2. Background of the Prior Art

The art is aware that certain phosphorus-containing compounds are useful as plant growth regulators. One of the most important phosphorus compounds of this class is 2-chloroethyl-phosphonic acid which has found importance as a plant growth regulator, particularly in the treatment of pineapples and soy beans to control their rate of growth. The present invention provides a new class of phosphorus-containing compounds useful as plant growth regulators not known heretofore, which compounds have utility in this area equivalent to 2-chloroethyl phosphonic acid. One of the primary characteristics of products of this type is the presence of the 2-chloroethyl group as the compounds are absorbed by the plant and release ethylene, a known plant regulator, in a form in which it can be used by the plant.

The art teaches various nitrogen-substituted phosphonamidates but none are suggested as having plant growth activity equivalent to those of the present invention. For example, in Chemical Abstracts, Vol. 66, abstract 27,927, and Vol. 65, page 5,488, there is disclosed the compound ethyl N,N-diethyl-P-chloromethyl phosphonamidate, which is related to the compounds of the present invention, but the presence of the chloromethyl group negates its value in the plant growth area as it cannot release the ethylene plant growth stimulant and hormone. In addition, in U.S. Pat. No. 3,010,986, there is disclosed the cyclohexyl ester of N,N-diallyl-P-(2-chloroethyl)-phosphonamidate, prepared by the reaction of 2-chloroethyl phosphonyl dichloride and cyclohexanol followed by the reaction of this intermediate with diallyl amine. Also, in Chemical Abstracts, Vol. 42, page 7,243, the compound 2-chloroethyl-N-phenyl-P-(2-chloroethyl) phosphonamidate is suggested as being prepared from its acid chloride and aniline. In none of these prior art teachings however, is there a disclosure of the 2-chloroethyl-N-substituted phosphorus compounds of this invention and in particular, 2-chloroethyl N-mono-substituted phosphorus compounds which have unique activity as plant growth stimulants. Accordingly, there is a clear need in the art for products of this type and processes by which they may be prepared.

SUMMARY OF THE INVENTION

It is accordingly one object of this invention to provide a new class of compounds comprising N-mono-substituted-P-(2-chloroethyl) phosphonamidates.

A further object of the invention is to provide economical processes by which these products may be produced.

It is a still further object of the invention to provide N-mono-substituted-P-(2-chloroethyl) phosphonamidate esters which may be prepared from readily available materials in an economic manner as well as procedures for their use as plant growth regulators.

Other objects and advantages of the present invention will become apparent as the description thereof proceeds.

In satisfaction of the foregoing objects and advantages, there are provided by this invention plant growth regulators of the following formula:

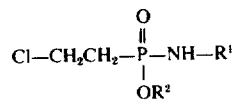

wherein $R^1$ is a halophenyl radical of the formula

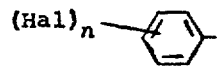

wherein Hal is a halogen (e.g. chlorine, bromine, iodine or fluorine, but preferably chlorine), and $n$ is an integer from 1 to 5, preferably 1 to 2, the halogen atoms being on any position on the phenyl ring, preferred radicals being 4-chlorophenyl, 3,4-dichlorophenyl, 2-chlorophenyl, 3-chlorophenyl, 3,4,5-trichlorophenyl and the corresponding bromo-substituted analogs, and $R_2$ is alkyl of 1 – 7 carbon atoms, (e.g. methyl, ethyl, propyl, etc.) or haloalkyl of about 1 – 7 carbon atoms, and preferably, haloalkyl wherein the halogen, which may be chlorine, bromine, iodine or fluorine, but preferably chlorine, and preferably on the betacarbon atom, for example, 2-chloroethyl, 2-chloropropyl, etc.

DESCRIPTION OF PREFERRED EMBODIMENTS

It has been found that the above-identified 2-chloroethyl mono-nitrogen-substituted phosphonamidic esters have unique activity as plant growth regulators and may be applied to plants such as pineapples, soy beans, tomatoes, small grains and the like to regulate growth and improve crop yields thereof. Thus, these compounds may be stated to be plant growth hormones as they operate to increase yields of the products mentioned as well as others.

The compounds of this invention are soluble in varying degrees in water and so they can be applied to the plants in aqueous solution composed wholly or partially of water; partial solutions include those formed of water and say acetone or methyl ethyl ketone. Any aqueous medium may be used provided that it is not toxic to the plant. Where any particular derivative is less water-soluble, it may be solubilized by the use of co-solvents and the like. Also, the compounds may be adsorbed on solid carriers such as vermiculite, attaclay, talc and the like for application in granular form. Dusts may also be used in which case the active ingredient(s) will be diluted with clays or other powders, for example pyrophyllite, diatomaceous earth and attapulgite.

EXAMPLE FOR APPLICATION OF N-SUBSTITUTED P-(2-CHLOROETHYL)-PHOSPHONAMIDATES TO PLANTS

The compounds can be applied to the plants at a concentration of from ½ – 10 lbs./Acre or higher, dependent on the particular derivative used. A preferred rate of application ranges from 2 – 5 lbs./Acre. The compounds need only be applied to the plant in low volumes of water to achieve satisfactory initiation, and this is an important advantage of this invention. Whereas it is necessary to apply the known agents in large volumes of water, of the order of 200 – 400 gallons/Acre, even up to 1,000 gallons/Acre in the case of ethylene to achieve flower initiation, it is possible to apply a compound of this invention in far lower volumes of water to achieve satisfactory flower initiation. For example, the active compounds of this invention can be applied in 50 gallons of water at the rate of 1 lb./Acre to achieve 100% flower induction on pineapples of the Smooth Cayenne variety. The ability to apply the agent in a reduced volume of water is a great agronomic advantage because a larger acreage of plantation can be treated before recourse to a water supply is necessary, smaller equipment can be used and costs can be reduced generally.

The compounds of this invention may be prepared by the reaction of 2-chloroethyl phosphonohalidic esters of the following formula:

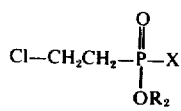

wherein $R_2$ is as above and X is halogen, preferably chlorine, with an amine of the formula:

$H_2N-R_1$

wherein $R^1$ is as above, in the presence of a suitable acid acceptor, the acceptor being employed to remove the hydrogen halide formed during the reaction. Preferred amines for use in the reaction are 4-chloroaniline and 3,4-dichloroaniline. The acid acceptor may be provided by use of an excess of the amine or may be provided by utilization of any other acid acceptor well known to the art. Preferred acid acceptors are the tertiary amines such as triethylamine, trimethylamine, pyridine, etc. as well as mixtures thereof. Also inorganic acid acceptors may be employed such as alkali metal hydroxides (e.g. NaOH and KOH), alkali metal carbonates ($Na_2CO_3$), alkali metal bicarbonates ($NaHCO_3$) and the like.

The reaction is conducted in the presence of a solvent which has preferably been dried to remove water prior to use. Preferred solvents to be employed in the process include diethyl ether, dioxane, petroleum ether, aromatic hydrocarbons (e.g. benzene, toluene), etc., as well as mixtures thereof.

The reaction is conducted at atmospheric pressure and at about room temperature (e.g. 20° to 30°C). The reactants are contacted in about stoichiometric quantities unless an excess of the amine is employed as the acid acceptor.

The process is preferably conducted by charging the amine to the solvent, and the phosphorus-containing compound added thereto at room temperature. Generally, either an excess of the amine or another acid acceptor is included in the amine/solvent solution.

After the materials have been mixed, the reaction is generally agitated for about 6 to 24 hours at room temperature, the amine salt removed by filtration and the resulting filtrate freed of solvent to provide the product of the invention.

The starting materials in this invention may be prepared in any desired manner but are preferably prepared by the reaction of phosphorus pentahalide with the diester of 2-chloroethyl phosphonic acid of the following formula:

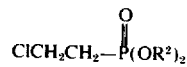

wherein $R^2$ is as above, which then yields the 2-chloroethyl phosphonohalidate of the following formula:

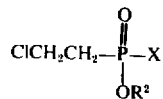

wherein X is as above. In this reaction it is of course preferable to use a bis ester in which both of the $R^2$ groups are the same so that only a single 2-chloroethyl phosphonohalidate is formed rather than a mixture thereof.

This reaction is generally conducted by charging the ester of 2-chloroethyl phosphonic acid to a reactor and adding an equivalent amount of the phosphorus pentahalide slowly thereto, preferably portionwise, while maintaining the temperature below about 80°C. Thereafter, after the addition is complete, heating the mixture at reflux for about two hours and distilling the resulting product, will provide the intermediate.

In an alternative procedure, the starting materials may be prepared by the reaction of an alcohol of the formula $R^2OH$ wherein $R^2$ is as above, such as absolute ethanol, on 2-chloroethyl phosphonyl dihalide at a temperature of about −10° to 15°C. in the presence of an acid acceptor such as those mentioned above to provide the intermediate after removal of the salt and solvent.

The following examples are provided to illustrate the compounds and processes of the present invention.

EXAMPLE I

2-Chloroethyl 2-Chloroethylphosphonochloridate:

There was charged 889.5 grams (3.3 moles) of

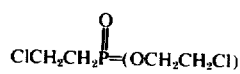

and 686.5 grams (3.3 moles) of phosphorus pentachloride added portionwise while maintaining the temperature below 80°C. The mixture was then refluxed for 2 hours at a pot temperature of 107°–109°C. The volatile materials were removed under aspirator vacuum to a final pot temperature of 120°C. The residue was then distilled under vacuum. There was obtained 646.8 g. of product boiling at 105° – 120°C. at 1 mm. pressure. This product was redistilled through a ¾ inch × 12 inch Vigreux head. There was obtained 536.0 grams boiling at 95° – 104°C. at 0.25 – 0.30 mm. pressure, the product of structure

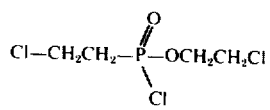

EXAMPLE 2

Ethyl 2-Chloroethylphosphonochloridate:

There was charged to a reaction flask: 100.8 grams (0.55 mol) of 2-chloroethylphosphonyl dichloride,

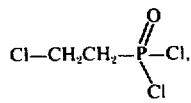

and 500 ml. dry diethyl ether. At a temperature of 0° – 5°C. there was added a solution of 23.0 grams (0.5 mole) absolute ethanol in 150 ml. dry ether followed by a solution of 50.5 grams (0.5 mole) triethylamine in 100 ml. dry diethyl ether. The resulting amine hydrochloride was filtered off and washed with ether. The filtrate was freed from solvent on the flash evaporator and the residue distilled. There was obtained 66.0 grams of product boiling at 45° – 48°C. at 0.07 – 0.09 mm. pressure of the structure

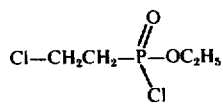

which was used as the starting material for Example 4 below.

Example 3

2-Chloroethyl N-(3,4-Dichlorophenyl)-P-(2-chloroethyl)-phosphonamidate:

A solution of 32.4 grams (0.2 mole) of 3,4-dichloroaniline in 500 ml. dry benzene was treated dropwise with 22.5 grams (0.1 mole) of 2-chloroethyl 2-chloroethylphosphonochloridate from Example 1. The mixture was left stirring overnight at room temperature. The insoluble material was filtered off and washed with benzene. The filtrate was heated to boiling on the steam bath, treated with nuchar and again filtered. The filtrate was evaporated to constant weight. The residue was triturated in a mortar with 100 ml. H$_2$O. The solid product was collected on a filter, washed with water, and dried.

Yield = 25.2 grams
Analysis:

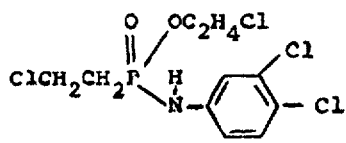

|  | Calc'd. | Found |
|---|---|---|
| % N | 4.01 | 3.80 |
| % P | 8.83 | 9.05 |

EXAMPLE 4

Ethyl N-(3,4-dichlorophenyl)-P-(2-chloroethyl)-phosphonamidate:

A solution of 32.4 grams (0.2 mole) of 3,4-dichloroaniline in 500 ml. dry benzene was treated dropwise with 19.1 grams (0.1 mole) ethyl 2-chloroethylphosphonochloridate from Example 2. The mixture was left stirring overnight at room temperature. The insoluble material was filtered off and washed with benzene. The filtrate was heated to boiling on the steam bath, treated with nuchar and again filtered. The filtrate was evaporated to constant weight. The residue was triturated in a mortar with 100 ml. H$_2$O. The solid product was collected on a filter, washed with water, and dried.

Yield: 25.2 grams of a product of the formula

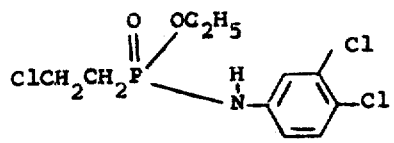

EXAMPLE 5

2-Chloroethyl-N-(4-Bromophenyl)-P-(2-chloroethyl)-Phosphonamidate:

The reaction of Example 3 was repeated except that 0.2 mole of 4-bromoaniline was employed in place of the 4-chloroaniline. From this reaction, there was recovered 27.6 grams of a compound of the following formula:

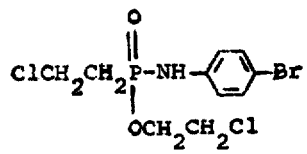

EXAMPLE 6

Ethyl N-(3,4,5-trichlorophenyl)-P-(2-chloroethyl) phosphonamidate:

The reaction of Example 4 was repeated except that 0.2 mole of 3,4,5-trichloroaniline was used in place of the 3,4-dichloroaniline. From this reaction, there was recovered 28.7 grams of a compound of the following formula:

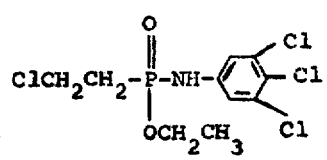

The reaction has been described herein with reference to certain preferred embodiments. However, the invention is not to be considered as limited thereto.

What is claimed is:

1. A method for increasing plant yield which comprises contacting the plant to be treated with an effective amount of a composition comprising an inert carrier and a plant yield increasing amount of a 2-chloroethyl phosphonamidic ester of the formula:

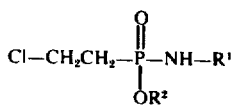

wherein $R^1$ is halophenyl, having the formula

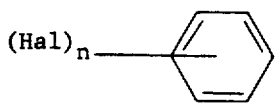

wherein Hal is chlorine or bromine, $n$ is an integer from 1 to 3 and $R^2$ is alkyl of one to seven carbon atoms or haloalkyl of one to seven carbon atoms wherein halo is chlorine.

2. The method according to claim 1 wherein said 2-chloroethyl phosphonamidic ester is 2-chloroethyl N-(3,4-dichlorophenyl)-P-(2-chloroethyl)-phosphonamidate.

3. The method according to claim 1 wherein said 2-chloroethyl phosphonamidic ester is ethyl N-(3,4-dichlorophenyl)-P-(2-chloroethyl)-phosphonamidate.

4. The method according to claim 1 wherein said 2-chloroethyl phosphonamidic ester is 2-chloroethyl-N-(4-bromophenyl)-P-(2-chloroethyl)-phosphonamidate.

5. The method according to claim 1 wherein said 2-chloroethyl phosphonamidic ester is ethyl N-(3,4,5-trichlorophenyl)-P-(2-chloroethyl) phosphonamidate.

6. The method according to claim 1 wherein said carrier is a liquid.

7. The method according to claim 6 wherein said carrier is water.

8. The method according to claim 1 wherein said carrier is a solid.

9. A method according to claim 1 which comprises utilizing said composition in an amount of ½ to 10 pounds per acre of said ester.

* * * * *